(12) United States Patent
Qian et al.

(10) Patent No.: US 10,191,354 B1
(45) Date of Patent: Jan. 29, 2019

(54) MULTI-PARAMETER NONCOLLINEAR PHASE-MATCHING FOR HIGH-AVERAGE-POWER OPTICAL PARAMETRIC CHIRPED-PULSE AMPLIFIER

(71) Applicant: Shanghai Jiao Tong University, Shanghai (CN)

(72) Inventors: Liejia Qian, Shanghai (CN); Daolong Tang, Shanghai (CN); Jing Wang, Shanghai (CN); Jingui Ma, Shanghai (CN); Bingjie Zhou, Shanghai (CN); Peng Yuan, Shanghai (CN); Guoqiang Xie, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/025,990

(22) Filed: Jul. 2, 2018

(30) Foreign Application Priority Data

Mar. 2, 2018 (CN) .......................... 2018 1 0176142

(51) Int. Cl.
| | |
|---|---|
| *G02F 1/39* | (2006.01) |
| *H01S 3/23* | (2006.01) |
| *H01S 3/16* | (2006.01) |
| *G02F 1/35* | (2006.01) |
| *H01S 3/10* | (2006.01) |
| *G02F 1/37* | (2006.01) |

(52) U.S. Cl.
CPC .............. *G02F 1/39* (2013.01); *G02F 1/3501* (2013.01); *G02F 1/353* (2013.01); *G02F 1/3544* (2013.01); *G02F 1/37* (2013.01); *H01S 3/10023* (2013.01); *H01S 3/10053* (2013.01); *H01S 3/1611* (2013.01); *H01S 3/1643* (2013.01); *H01S 3/1673* (2013.01); *H01S 3/235* (2013.01); *H01S 3/2316* (2013.01); *G02F 2001/3503* (2013.01); *G02F 2001/354* (2013.01); *G02F 2001/3528* (2013.01); *G02F 2001/3546* (2013.01); *G02F 2001/392* (2013.01)

(58) Field of Classification Search
CPC ........ G02F 1/3501; G02F 1/3544; G02F 1/39; G02F 2001/354; G02F 2001/3546; G02F 2001/392; H01S 3/10053
See application file for complete search history.

(56) References Cited

U.S. PATENT DOCUMENTS

| | | | |
|---|---|---|---|
| 6,181,463 B1* | 1/2001 | Galvanauskas ........... | G02F 1/39 359/330 |
| 9,711,931 B1 | 7/2017 | Qian et al. | |

(Continued)

*Primary Examiner* — Daniel Petkovsek
(74) *Attorney, Agent, or Firm* — Mei & Mark LLP; Manni Li (57) ABSTRACT

A high-average-power OPCPA amplifier comprising a pump laser, a signal laser, and a nonlinear crystal amplifier. The pump laser includes an Nd:YVO$_4$ laser oscillator-regenerative amplifier, an Nd:YAG boost amplifier, a frequency-doubling convertor, and a frequency-tripling convertor. The signal laser includes a supercontinuum generator, a pulse stretcher, and a pulse compressor. The chirped signal and the pump laser is intersected with a noncollinear angle of 3.0° to 4.0° in the nonlinear crystal amplifier and the temperature of the crystal amplifier is set at higher than 320K for simultaneous temperature- and wavelength-insensitive phase-matching.

5 Claims, 6 Drawing Sheets

(56) References Cited

U.S. PATENT DOCUMENTS

| | | | | |
|---|---|---|---|---|
| 2005/0243876 A1* | 11/2005 | Kung | ....................... | G02F 1/39 |
| | | | | 372/21 |
| 2006/0013272 A1* | 1/2006 | Kopf | .................... | H01S 3/0057 |
| | | | | 372/30 |
| 2007/0013995 A1* | 1/2007 | Kaertner | ................ | G02F 1/133 |
| | | | | 359/330 |

* cited by examiner

MULTI-PARAMETER NONCOLLINEAR PHASE-MATCHING FOR HIGH-AVERAGE-POWER OPTICAL PARAMETRIC CHIRPED-PULSE AMPLIFIER

CROSS-REFERENCE TO RELATED APPLICATION

The subject application claims priority on Chinese application no. 201810176142.1 filed on Mar. 2, 2018. The contents and subject matter of the Chinese priority application are incorporated herein by reference.

FIELD OF INVENTION

The present invention relates to ultrashort laser amplification, particularly, a high average-power optical parametric chirped-pulse amplifier that is based on multi-parameter noncollinear phase-matching.

BACKGROUND OF INVENTION

Currently, optical parametric chirped-pulse amplification (OPCPA) has become an effective technique for generating ultrashort pulses with ultrahigh peak-powers. The basic principles of OPCPA includes the following three steps:

first, pulse broadening, that is, ultrashort pulses are stretched to chirped pulses by a grating stretcher;

second, pulse amplification, that is, the chirped signal pulses are amplified in parametric amplifiers, where the energy of the pump pulse flows into the chirped signal pulse and an idler pulse is generated simultaneously; and third, pulse compression, that is, the amplified chirped pulses are compressed back to the original pulse duration to generate ultrashort intense pulses with a grating compressor.

Because of its satisfactory characteristics of high-efficiency, large amplified bandwidth and wavelength tunability, OPCPA may be employed to generate high-power, few-cycle pulses from visible to mid-infrared spectral region. In fact, the peak power of the ultrashort pulse has already reached petawatt level by OPCPA. However, high average-power OPCPA remains a bottleneck problem in the field of laser technology. Because of the absorption of the laser energy, thermal effects becomes the dominating problem that limits the average-power scaling in OPCPA. The reason is that the nonuniform temperature distribution destroys the key phase-matching (PM) condition, which leads to the drop in the efficiency and deterioration of pulse characteristics in the amplifiers. Currently, the average power in OPCPA is still limited to 100 W, which is far less than desired power level for revolutionizing the ultrafast science.

Currently, the solutions to high average-power OPCPA amplifier mainly focus on improving the heat dissipation ability. However, the inherent problem of thermally-induced phase-mismatch cannot be resolved with these solutions. In fact, temperature-insensitive PM is the prerequisite for high average-power OPCPA amplifier. Nevertheless, the main difficulty is the lack of the control parameter in manipulating the PM. In our previous work (U.S. Pat. No. 9,711,931), we have realized simultaneous temperature- and wavelength-insensitive PM with the two control parameters of noncollinear configuration and angular dispersion, which may be used to produce ultrashort pulses with both high peak powers and high average powers.

SUMMARY OF THE INVENTION

The present invention provides a multi-parameter noncollinear phase-matching (PM) that may be employed to simultaneously boost the average- and peak-power of few-cycle pulses.

In the present invention, the PM condition is the main factor that governs parametric amplifier. Particularly, the noncollinear angle between the pump and signal is an effective control parameter in manipulation the PM. In the traditional noncollinear PM, the noncollinear angle is mainly devoted to achieving wavelength-insensitive PM or temperature-insensitive PM. However, the noncollinear angle for realizing the temperature-insensitive PM is generally different from that for wavelength-insensitive PM. Thus, it is difficult to achieve simultaneous temperature- and wavelength-insensitive PM with the noncollinear angle alone. In the present invention, by means of the multi-parameter noncollinear PM, the noncollinear angle for temperature-insensitive PM and wavelength-insensitive PM coincide with each other. Thus, simultaneous temperature- and wavelength-insensitive PM may be achieved only with the noncollinear angle (without another control parameter such as the angular dispersion in U.S. Pat. No. 9,711,931).

The present invention provides a simultaneous temperature- and wavelength-insensitive parametric amplifier that comprises a pump laser, a signal laser, and a crystal amplifier. The pump laser comprises an Nd:YVO$_4$ laser oscillator-regenerative amplifier and an Nd:YAG boost amplifier. The pump laser is frequency-doubled and frequency-tripled successively in the two nonlinear crystals. The signal laser is produced with a supercontinuum generator. The signal laser is temporally chirped in the stretcher. After the amplification process in the nonlinear crystal amplifier, the amplified signal is then compressed in the compressor. The pump laser and the chirped signal is synchronized with an electronic phase-locking loop. In the amplification stage, the pump energy flows into the signal laser. By adjusting the direction of the reflector in the pump path, the signal and pump lasers are intersected with a noncollinear angle in the nonlinear crystal amplifier. The operating temperature of the nonlinear crystal amplifier is designated by the crystal oven.

In the present invention, the noncollinear angle between the pump and signal is between 3.5° and 4.0°.

In the present invention, the central wavelength of the pump laser is between 350 nm and 360 nm.

In the present invention, the central wavelength of the signal laser is between 450 nm and 700 nm.

In the present invention, the operating temperature of the nonlinear crystal amplifier is higher than 320K.

The present invention may be utilized to support simultaneous temperature- and wavelength-insensitive PM, which provides a promising route to generating ultrashort pulse with both high-peak power and high-average power. These and other objectives, features, and advantages of the present invention become apparent from the following detailed description, the accompanying drawings, and the appended claims.

BRIEF DESCRIPTION OF THE DRAWINGS

FIG. 1 shows the schematic and basic principle of the present invention, among which, FIG. 1(a) shows a parametric amplifier with noncollinear configuration; FIG. 1(b) shows the ability of noncollinear angle in manipulating both the wavelength and temperature characteristics of the amplifier; FIG. 1(c) shows the required noncollinear angle for achieving wavelength-insensitive PM (curve A) and temperature-insensitive PM (curve B); and FIG. 1(d) shows dependence of the optimal noncollinear angle and PM temperature on the signal central wavelength for achieving temperature- and wavelength-insensitive PM.

FIG. 3 compares the performances of the present invention with traditional OPCPA amplifier, among which FIG. 3(a) shows the wavevector mismatch versus the signal wavelength for several operating temperatures; FIG. 3(b) shows the dependence of the wavevector mismatch on temperature deviation; FIG. 3(c) shows the small-signal gain versus the signal wavelength at several temperatures; and FIG. 3(d) shows the dependence of the small-signal gain on temperature deviation.

FIG. 4 shows the optimization of the parameters of the present invention, among which, FIG. 4(a) shows the dependence of the conversion efficiency on temporal delay between the signal and pump; and FIG. 4(b) shows the amplified bandwidth and conversion efficiency versus the bandwidth of the incident signal.

FIG. 5 shows the signal efficiency evolution versus crystal length, among which, FIG. 5(a) shows the evolution of the efficiency inside the crystal at several pump average-powers in the traditional OPCPA amplifier; and FIG. 5(b) shows the evolution of the efficiency inside the crystal at several pump average-powers in the amplifier of the present invention.

FIG. 6 shows spectral and pulse characteristics at several pump average-powers, among which, FIG. 6(a) shows the amplified signal spectrum in the traditional amplifier; FIG. 6(b) shows the amplified signal spectrum in the amplifier of the present invention; FIG. 6(c) shows the compressed pulses in the traditional OPCPA amplifier; and FIG. 6(d) shows the compressed pulses in the amplifier of the present invention.

FIG. 7 shows the conversion efficiency and output signal power in traditional OPCPA amplifier and the amplifier of the present invention, among which, FIG. 7(a) shows the dependence of the conversion efficiency on the pump average-powers; and FIG. 7(b) shows the output signal average-power versus the pump average-powers.

Reference numbers are used to describe the following structures:

1—Nd:YVO$_4$ laser oscillator-regenerative amplifier; 2—Nd:YAG boost amplifier; 3—beam splitter; 4—frequency-doubling crystal; 5—frequency-tripling crystal; 6—reflector; 7—pump pulse; 8—supercontinumm generator; 9—pulse stretcher; 10—electronic phase-locking loop; 11—chirped pulse; 12—nonlinear optical crystal for parametric amplification; 13—crystal oven; 14—amplified chirped signal; 15—idler pulse; 16—pulse compressor. 17—ultrashort pulse with both high peak and high average powers.

DETAILED DESCRIPTION OF THE INVENTION AND EMBODIMENTS

The present invention is further described according to a group of numerical simulation.

Figures 1, 1A, 1B, 1C, 1D:
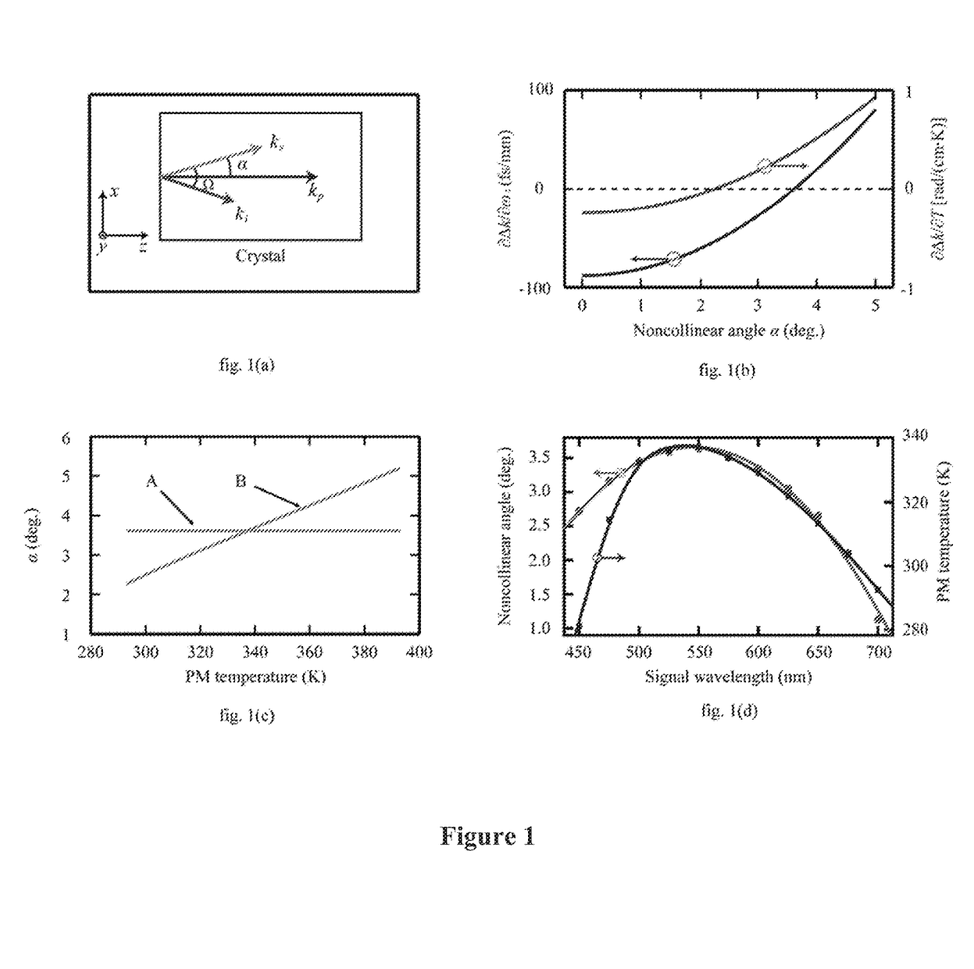

FIG. 1(a) illustrates the optical setup of the OPCPA amplifier based on the noncollinear configuration. Lithium triborate (LBO) is chosen as the nonlinear crystal in the crystal amplifier because of its favorable characteristics of high damage threshold and small spatial walk-off. FIG. 1(b) shows the role of the noncollinear angle α in manipulating PM at the PM temperature of $T_0$=293.0K (traditional OPCPA amplifier). Because of its ability in manipulation PM, the amplifier may be insensitive to temperature ($\partial\Delta k/\partial T$=0) or be insensitive to wavelength ($\partial\Delta k/\partial\omega_s$=0) with noncollinear configuration. However, the two characteristics (i.e., the amplifier is insensitive to temperature and the amplifier is insensitive to wavelength) are achieved at different angles of α=2.3° and 3.6°, respectively, which indicates that the amplifier cannot be insensitive to both temperature and wavelength only with the noncollinear configuration in the traditional OPCPA amplifier. In the present invention, the problem can be solved by the proposed multi-parameter noncollinear PM. Specifically, by regulating the PM temperature of the amplifier, the noncollinear angle for realizing the two characteristics coincide and the amplifier may be simultaneously insensitive to temperature and wavelength. For instance, for the case of the pump wavelength of 355 nm and signal wavelength of 550 nm, while the noncollinear angle for wavelength insensitive amplifier is relatively stable at different PM temperatures (curve A), it increases with the PM temperature for temperature insensitive amplifier (curve B). In particular, at the PM temperature of 337.5K, the amplifier is insensitive to both temperature and wavelength. As shown in FIG. 1(d), the present invention is valid as long as the noncollinear angle and PM temperature vary with the signal wavelength accordingly.

Figure 2:
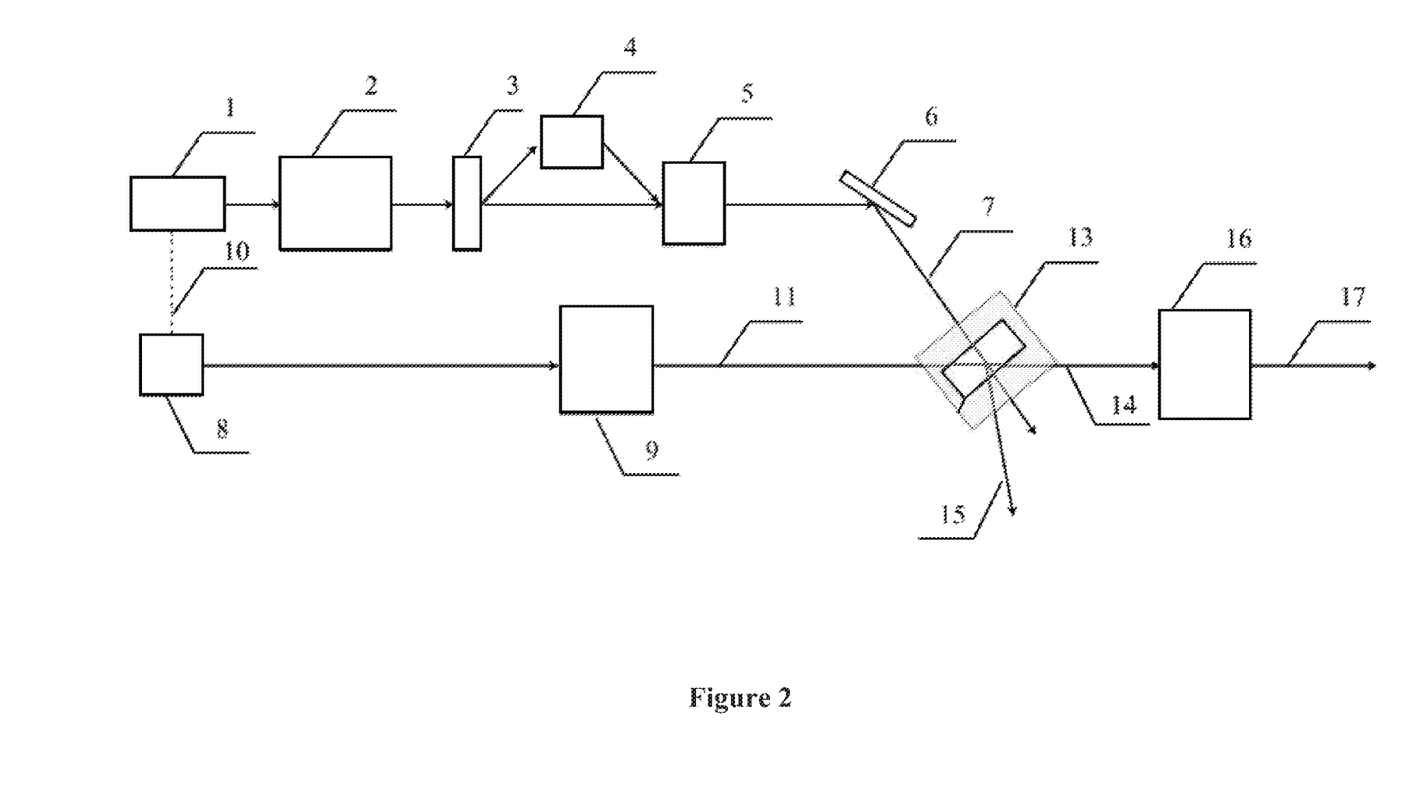
FIG. 2 shows the optical setup of the amplifier of the present invention.

As shown in FIG. 2, the present invention provides a simultaneous temperature- and wavelength-insensitive OPCPA amplifier that comprises a pump laser, a signal laser, and a crystal amplifier. The pump laser comprises an Nd:YVO$_4$ laser oscillator-regenerative amplifier and an Nd:YAG boost amplifier. The pump laser is frequency-doubled and frequency-tripled successively in two nonlinear crystals. The signal laser is produced with supercontinuum generator. The signal laser is temporally chirped in the stretcher. After the amplification process in the crystal amplifier, the amplified signal is compressed in the compressor. The pump laser and the chirped signal is synchronized with an electronic phase-locking loop. In the amplification stage, the pump energy flows into the signal laser. By adjusting the direction of the reflector in the pump path, the signal and pump lasers are intersected with a noncollinear angle in the crystal amplifier.

Figures 3, 3A, 3B, 3C, 3D:
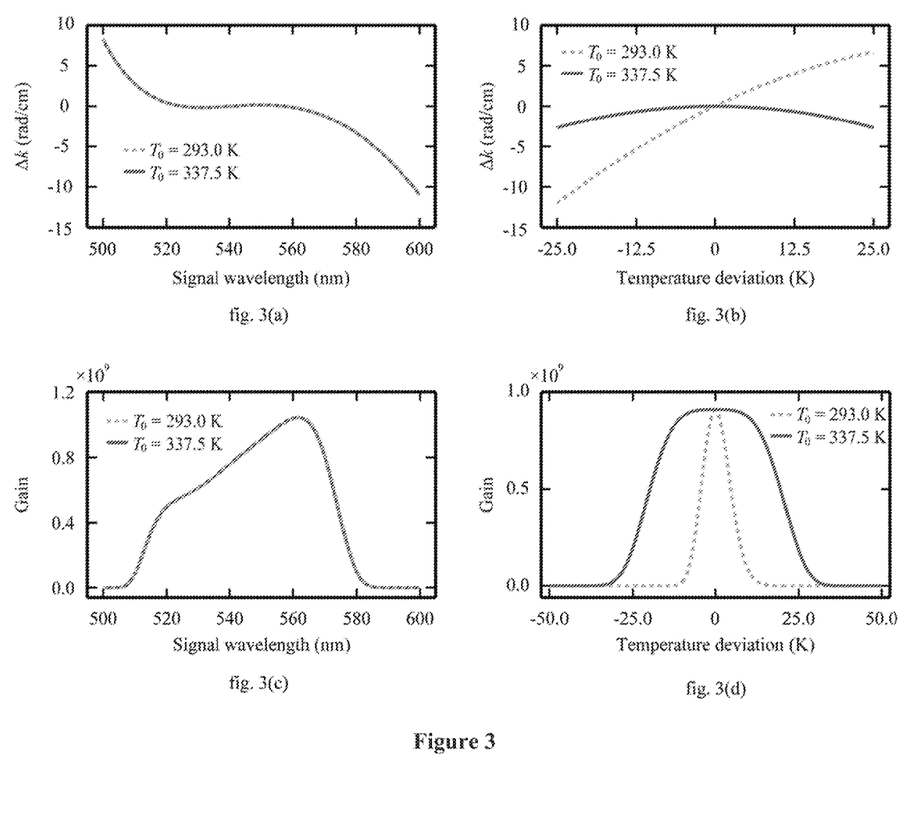

FIG. 3 compares the wavevector mismatch and small-signal gain in the traditional OPCPA amplifier ($T_0$=293.0K) and the amplifier of the present invention ($T_0$=337.5K). At the selected wavelength, not only the first-order term $\partial\Delta/\partial\omega_s$ is eliminated with the noncollinear configuration, but also the second-order term $\partial^2\Delta k/\partial\omega_s^2$ is negligible. Thus, the dependence of Δk on the signal wavelength is cubic in both traditional OPCPA amplifier and the amplifier of the present invention. Although the wavelength-dependent wavevector-mismatches are nearly identical in traditional OPCPA amplifier and the amplifier of the present invention, the temperature-dependent wavevector-mismatch is significantly alleviated in the amplifier of the present invention, as illustrated in FIG. 3(b). As the first-order term $\partial\Delta k/\partial T$ is eliminated in the amplifier of the present invention, Δk is then dominated by the second-order term $\partial^2\Delta k/\partial T^2$, which is considerably smaller compared to that determined by $\partial\Delta k/\partial T$ in the traditional OPCPA amplifier. On the other hand, as shown in FIG. 3(c), because of the similar wavelength-dependent wavevector-mismatch, the small signal gain versus the signal wavelength is comparable between the traditional OPCPA amplifier and the amplifier of the present invention. In contrast, as shown in FIG. 3(d), a large temperature bandwidth of 41.1K (full width at the half maximum, FWHM) may be anticipated in the amplifier of the present invention, which is improved by a factor of 4.3 compared to 9.5K in the traditional OPCPA amplifier.

In the present invention, a theoretical model has been built to describe high-average-power OPCPA by coupling the parametric process with heat transfer process. In the model, the temperature-dependent phase-mismatch, dispersion effects, noncollinear geometry, and diffraction are all taken into account, as well as the inhomogeneous distribution of temperature inside the crystal. Based on the symmetric split-step Fast Fourier Transform and the fourth-order Runge-Kutta method, the amplification characteristics in traditional OPCPA amplifier and that of the present invention are numerically compared. At the same time, the heat transfer process is also solved by finite difference method. In the simulations, the pulse durations (FWHM) of the pump and chirped signal pulses are 15 ps and 10 ps in Gaussian profiles, respectively. The beam diameters (FWHM) of the pump (10 order super-Gaussian profile) and signal (Gaussian profile) are both 5 mm. The peak intensity of the pump pulse is fixed at 4.5 $GW/cm^2$.

Figure 4:
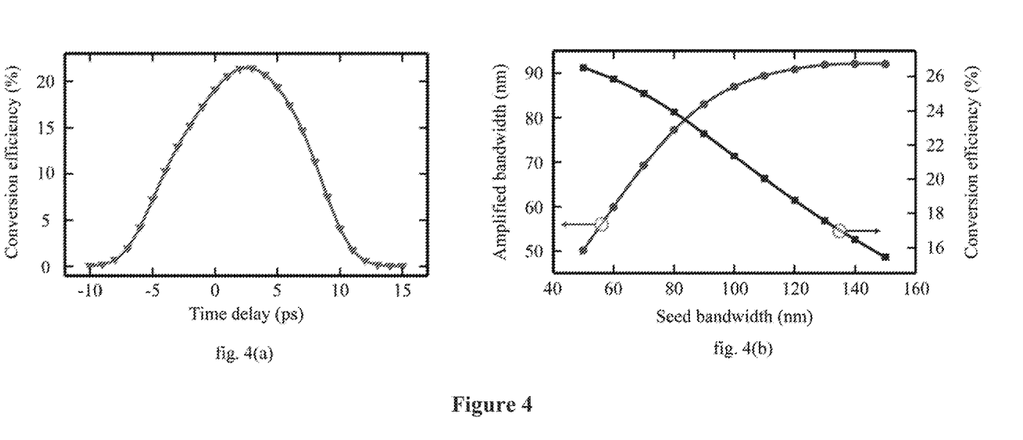

The operating parameters for the OPCPA amplifier are firstly optimized. The temporal walk-off between the signal and pump limits the interaction length and thus affect the conversion efficiency. The effect could be partially compensated by introducing a temporal delay between the pump and signal before amplification. As shown in FIG. 4($a$), the maximum conversion efficiency occurs with a temporal delay of about 2 ps (with the pump pulse in advance). Besides, as shown in FIG. 4($b$), the efficiency and amplified bandwidth are influenced by the spectral bandwidth of the seed signal. The amplified bandwidth increases with the seed bandwidth because more spectral components experience high gain, until it becomes steady as the bandwidth is ultimately limited by the dispersion effect. In comparison, due to the severer phase-mismatch, the efficiency always decreases with the seed bandwidth. To achieve an optimized efficiency-bandwidth product for the amplifier, the seed bandwidth is selected as 100 nm.

Figure 5:
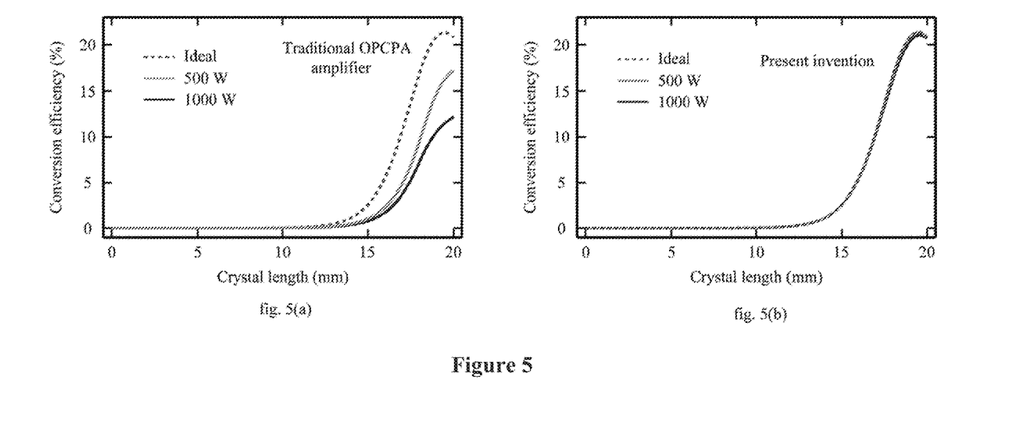

The conversion efficiencies in the traditional OPCPA amplifier and the amplifier of the present invention are compared in FIG. 5. FIGS. 5($a$) and 5($b$) show the conversion efficiency for several pump powers in the traditional OPCPA and the amplifier of the present invention. Clearly, in the ideal case which excludes the thermal distortions, the conversion efficiency keeps rising and a maximal value of 21% is achieved in both cases with a 20 mm-long LBO crystal. However, in the traditional OPCPA amplifier, the conversion efficiency decreases with the pump average-power because of the thermally-induced phase-mismatch. For example, the conversion efficiency decreases to 17% and 12% for pump average-powers of 500 W and 1000 W, respectively. In comparison, the advantages of the present invention is revealed in the high-average-power regime. As the amplifier is insensitive to the temperature, the evolution of the conversion efficiency in the high-average-power regime is nearly the same as that of the ideal case, and the conversion efficiency remains at 21% when the pump average-power increases to 2000 W.

Figure 6:
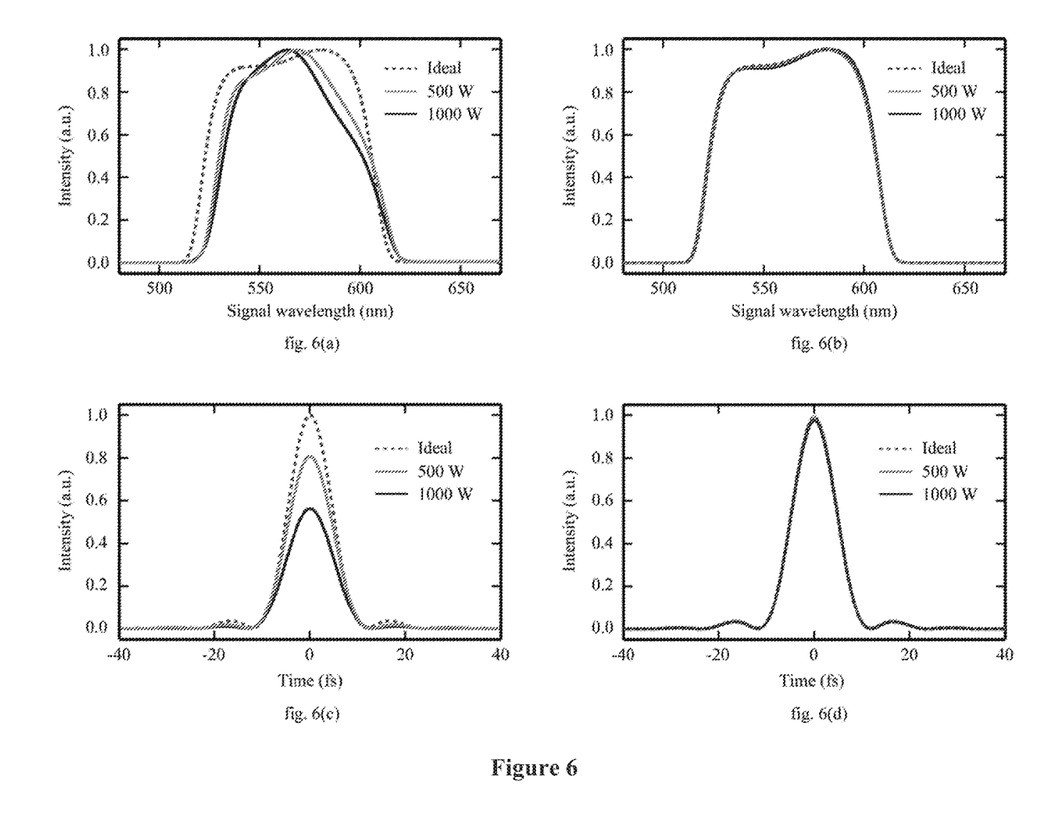

As shown in FIG. 6, the amplifier of the present invention is also superior in the pulse characteristics compared with traditional OPCPA amplifier. FIGS. 6($a$) and 6($b$) compare the amplified signal spectra in the traditional OPCPA amplifier and the amplifier of the present invention, respectively. Clearly, in the ideal non-thermal case, the spectra in the two cases are nearly the same. However, in the high average-power regime, the amplified spectrum in the traditional OPCPA amplifier is deteriorated because of the severe thermal effects. In contrast, the amplified spectrum in the amplifier of the present invention is stable in high average-power regime and is nearly identical to that of the ideal non-thermal case because the amplifier is insensitive to the temperature. On the other hand, attributing to the large amplified bandwidth, sub-10 fs pulses can be generated in the traditional OPCPA amplifier and the amplifier of the present invention for the non-thermal case. However, as shown in FIG. 6($c$), the performance of the traditional OPCPA amplifier is deteriorated in the high average power regime. Not only the pulse duration increases with a narrowed signal bandwidth, but also the intensity decreases because of a lower conversion efficiency. In comparison, such problem is effectively resolved by the present invention. As illustrated in FIG. 6($d$), both the pulse duration and peak intensity are robust against the average power. It may pave the way to generate ultrafast pulses with both high peak and average powers.

Figures 7, 7A, 7B:
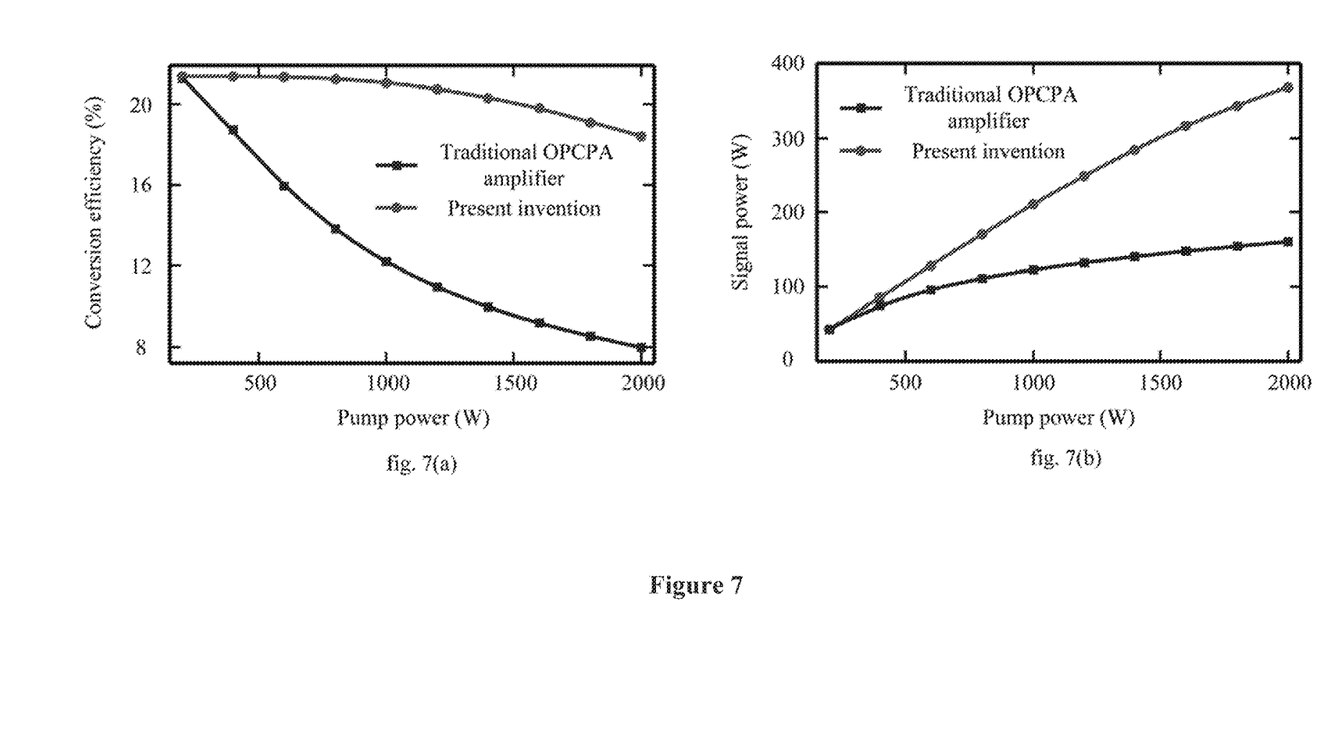

The performance of the amplifier of the present invention is further investigated and illustrated at higher average-power. As shown in FIG. 7($a$), the conversion efficiency in the traditional OPCPA amplifier dramatically decreases with the pump average-power due to the severer thermally-induced phase-mismatch. In contrast, the amplifier of the present invention exhibits significantly improved conversion efficiency. For example, with a pump average-power of 2 kW, the conversion efficiency in the amplifier of the present invention still reaches up to 18%, which is more than 2 times of that in traditional OPCPA amplifier. As shown in FIG. 7($b$), the high conversion efficiency improves the signal power accordingly. Currently, average power of the OPCPA is limited to 53 W. Based on the amplifier of the present invention, the average power may be successfully boosted to several hundreds of watts owing to the characteristics of temperature insensitivity.

In conclusion, simultaneous temperature- and wavelength-insensitive PM condition can be achieved only with the noncollinear configuration by the multi-parameter noncollinear PM of the present invention. Compared to the traditional OPCPA amplifier, the amplifier of the present invention is superior in both conversion efficiency and pulse characteristics. The amplifier of the present invention may be employed to generate ultra-short pulses with both ultra-high-peak and high-average-power, which are very critical in the high-intensity laser science.

One skilled in the art understands that the embodiments of the present invention as shown in the drawings and described above are exemplary only and not intended to be limiting the scope of the invention. It is thus seen that the objects of the present invention have been fully and effectively accomplished. Its embodiments have been shown and described for the purposes of illustrating the functional and structural principles of the present invention and is subject to change without departure from such principles of the present invention. Therefore, the present invention includes all modifications encompassed within the spirit and scope of the following claims.

We claim:

1. A high-average-power optical parametric chirped-pulse amplification (OPCPA) amplifier, comprising
    a pump laser system on a first optical pathway, the pump laser system comprising an $Nd:YVO_4$ laser oscillator-regenerative amplifier and an Nd:YAG boost amplifier that are sequentially arranged on the first optical pathway, a beam splitter after the pump laser system;

a frequency-doubled convertor arranged on the first optical pathway after the beam splitter, a frequency-tripled convertor arranged on the first optical pathway after the frequency-doubled convertor, a reflector on the first optical pathway arranged after the frequency-tripled convertor, a signal laser system on a second optical pathway, the signal laser system comprises a supercontinuum generator, a stretcher on the second optical pathway after the signal laser system, a nonlinear crystal amplifier, the nonlinear crystal amplifier having an optic pathway, a pulse compressor arranged along the optical pathway after the nonlinear crystal amplifier, an electronic phase-locking loop, and a crystal oven encasing the nonlinear crystal amplifier, wherein the pump laser system and the signal laser system are synchronized with the electronic phase-locking loop;

a pump laser beam is generated from the pump laser system, is frequency-doubled in the frequency-doubled convertor, and frequency-tripled in the frequency-tripled convertor;

a signal laser beam is generated from the signal laser system, passes through the stretcher, and is temporally chirped to form a chirped signal laser beam;

the chirped signal laser beam is amplified in the nonlinear crystal amplifier to form an amplified chirped signal laser beam, and the amplified chirped signal laser beam is compressed in the compressor;

energy flows from the pump laser beam into the signal laser beam during amplification in the nonlinear crystal amplifier inside the crystal oven;

by adjusting a direction of the reflector in the first optical pathway, the signal laser beam and the pump laser beam are intersected with a noncollinear angle in the nonlinear crystal amplifier; and by adjusting the temperature of the crystal oven, the nonlinear crystal amplifier operates at a designated phase-matching temperature.

2. The high-average-power OPCPA amplifier as described in claim 1, wherein the noncollinear angle between the pump and signal is between 3.5° and 4.0°.

3. The high-average-power OPCPA amplifier as described in claim 1, wherein a central wavelength of the pump laser beam generated by the pump laser system is between 350 nm and 360 nm.

4. The high-average-power OPCPA amplifier as described in claim 1, wherein a central wavelength of the signal laser beam generated by the signal laser system is between 450 nm and 700 nm.

5. The high-average-power OPCPA amplifier as described in claim 1, wherein an operating temperature for the nonlinear crystal amplifier is higher than 320 K.

* * * * *